(12) United States Patent
Wu et al.

(10) Patent No.: US 8,719,687 B2
(45) Date of Patent: May 6, 2014

(54) METHOD FOR SUMMARIZING VIDEO AND DISPLAYING THE SUMMARY IN THREE-DIMENSIONAL SCENES

(75) Inventors: Tai Pang Wu, Hong Kong (HK); Zhiqian Li, Hong Kong (HK); Xiao Zhou, GuangZhou (CN); Chun Man Lawrence Mak, Hong Kong (HK)

(73) Assignee: Hong Kong Applied Science and Technology Research, Hong Kong Science Park, Shatin, New Territories, Hong Kong (CN)

( * ) Notice: Subject to any disclaimer, the term of this patent is extended or adjusted under 35 U.S.C. 154(b) by 178 days.

(21) Appl. No.: 13/335,934

(22) Filed: Dec. 23, 2011

(65) Prior Publication Data
US 2013/0163961 A1     Jun. 27, 2013

(51) Int. Cl.
*G06K 9/34* (2006.01)
(52) U.S. Cl.
USPC .......................................................... 715/201
(58) Field of Classification Search
CPC ....................................................... G06K 9/34
USPC .......................................................... 715/201
See application file for complete search history.

(56) References Cited

U.S. PATENT DOCUMENTS

| | | | |
|---|---|---|---|
| 2004/0130567 A1* | 7/2004 | Ekin et al. ...................... | 345/723 |
| 2009/0219300 A1 | 9/2009 | Peleg et al. | |
| 2010/0092037 A1 | 4/2010 | Peleg et al. | |
| 2012/0027371 A1* | 2/2012 | Hackett et al. ................ | 386/223 |

OTHER PUBLICATIONS

Pritch et al., Non-Chronological Video Synopsis and Indexing, IEEE Trasactions on Pattern Analysis and Machine Intelligence, 2008, School of Computer Science and Engineering, The Hebrew University of Jerusalem, Jerusalem, Israel.

* cited by examiner

*Primary Examiner* — Doug Hutton, Jr.
*Assistant Examiner* — Tionna Burke
(74) *Attorney, Agent, or Firm* — Ella Cheong Hong Kong; Sam T. Yip

(57) ABSTRACT

A computer-implementable method for creating a summary video with depth information, comprising: recognizing moving objects from the input original video; generating an animated moving object cutout for each of the recognized moving objects by duplicating and stacking successive frames in the input original video containing images of the respective moving object; constructing a scene background by using texture of scenes in the input original video and estimating any missing portion; rendering a Dynamic 3D Scene by using depth information of foreground objects in the input original video and the scene background to create a three-dimensional scene and overlaying the animated moving object cutouts on to the three-dimensional scene according to their respective longitude, latitude, and depth locations in the three-dimensional scene; and synthesizing the summary video, by using the Dynamic 3D Scene.

9 Claims, 3 Drawing Sheets

# METHOD FOR SUMMARIZING VIDEO AND DISPLAYING THE SUMMARY IN THREE-DIMENSIONAL SCENES

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The presently claimed invention relates generally to video analysis, indexing, and retrieval in video surveillance. Specifically, the presently claimed invention relates to the method and system of analyzing and summarizing videos to aid the searching and identification of desired contents.

BACKGROUND

Sorting through a video clip trying to locate certain contents or events is a tedious and time-consuming process. One must carefully watch through an entire video clip, which may or may not contain scenes of interest in every frame. The problem is more acute in the case of video surveillance where the surveyed scene is being video-captured non-stop for a long period of time. Furthermore, in commercial and public security monitoring, it often involves a network of hundreds of surveillance video cameras capturing multiple streams of infinite video. There are billions of surveillance video cameras mounted all over the world. In the southern city of China, Shenzhen alone, it is estimated that more than one million video cameras are deployed.

Therefore, there is a need for a way to summarize or condense a video clip to show only portions of the video that might possibly contain the desired contents. Some of the traditional video summarization techniques condense moving objects temporally and display the results in conventional two-dimensional motion pictures. But such condensed two-dimensional motion pictures can clatter the moving objects and make the visual context more than enough for human visual digestion. Other traditional video summarization techniques simply remove silent frames from the source video clip, which cannot achieve optimal summarization effect.

SUMMARY

It is an objective of the presently claimed invention to provide a method for summarizing video by condensing moving objects temporally and displaying the results in three-dimensional scene. The additional depth dimension allows effective natural human visual perception in that parallax and disparity are utilized in aiding the visual digestion of the locality of the moving objects over time. Because the video summarization method generates the resulting summary video with three-dimensional information, it is possible to create novel views of the scene as captured by virtual cameras.

It is a further objective of the presently claimed invention to provide a summary video comprising two display regions: an appeared object list and a scene review section. The appeared object list shows the moving object cutouts by excluding background information such that user can focus on the objects only. The scene review section shows a view of the three-dimensional scene with the object cutouts.

BRIEF DESCRIPTION OF THE DRAWINGS

Embodiments of the invention are described in more detail hereinafter with reference to the drawings, in which.

DETAILED DESCRIPTION

In the following description, methods and system implementations of video summarization with depth dimension are set forth as preferred examples. It will be apparent to those skilled in the art that modifications, including additions and/or substitutions may be made without departing from the scope and spirit of the invention. Specific details may be omitted so as not to obscure the invention; however, the disclosure is written to enable one skilled in the art to practice the teachings herein without undue experimentation.

The presently claimed invention provides a computer-implementable method for summarizing video by first recognizing moving objects in an input original video, and utilizing the three-dimensional information of the scene for synthesizing the summary video. The object recognition can be based on selection criteria such as the object's shape and form, color, exact appearance, and pattern of spatial movement.

Figure 1:
FIG. 1 shows one embodiment of the summary video comprising the appeared object list and the scene review section.

Referring to FIG. 1. Each moving object cutout 122 is animated from duplicating and stacking the successive input original video frames containing images of the moving object and discarding the frame image pixels surrounding the moving object. Thus, each moving object cutout is a set of successive video frames with a certain fixed temporal order. As such, the motion sequence of each animated moving object cutout is maintained, along with its spatial movement longitude, latitude, and depth location data in the scene. The animated moving object cutout frame sets are then preserved in persistent memory data storage. The background 121 of the scene is constructed using the texture of the respective scene in the input original video. The missing portions can be automatically estimated. The background can also be input by the user.

Still referring to FIG. 1. The presently claimed computer-implementable video summarization method utilizes Dynamic 3D Scene to synthesize the output summary video, wherein the Dynamic 3D Scene displays both the static background 121 and temporally disordered and animated moving object cutouts 122. The depth information of the foreground objects and the background is used in the creation of the Dynamic 3D Scene. The Dynamic 3D Scene is then rendered by overlaying the animated moving object cutouts' frame sets, retrieved from persistent memory data storage, on to the three-dimensional scene according to their respective longitude, latitude, and depth locations in the scene. The generation of the Dynamic 3D Scene can be generally described by the following steps:

1. The depth information of the background scene is known.
2. The 3D locations of the moving objects are known for each frame.

3. The automatic estimated or user input background image is texture-mapped to the depth of the 3D scene.
4. User can select a 3D proxy for each type of object. For example, a planner object or a human 3D model can represent a human, and a planner object or a vehicle 3D model can represent a vehicle.
5. Each object cutout has a dedicated 3D proxy.
6. For each moving object, the frames of the object cutout are considered textures to be mapped to the selected 3D object (as in step 4) to impose the respective appearance.
7. Put the texture-mapped 3D proxies on to the 3D scene.
8. When time elapses, the locations of the textured mapped 3D proxies are updated (depending on the 3D locations of the respective moving objects at the respective time).
9. At the same time, the appearance (i.e. the texture) of the 3D proxy is updated by the next frame of the object cutouts of the respective objects.
10. Steps 8 and 9) are repeated until all the moving objects are displayed and then disappeared.

In accordance to one embodiment of the presently claimed invention, the temporal order of the animated moving object cutouts can be changed. For example, two objects that appear in the scene in two different time periods can be made appearing together in the Dynamic 3D Scene at the same time by overlaying both sets of frames of the respective animated moving object cutouts on to the three-dimensional scene at their respective locations in the scene. Therefore, the length of the summary video can be made substantially shortened by showing multiple moving objects in the Dynamic 3D Scene together simultaneously, where the moving objects could have appeared individually during separate time periods in the input original video. It is user configurable as to how many simultaneously and which animated moving object cutouts are to be appeared in the Dynamic 3D Scene.

In accordance to another embodiment, one frame can be selected from the animated moving object cutout frame set and be overlaid on to the three-dimensional scene at its respective location in the scene after the animated moving object cutout frame set has been completely replayed in the Dynamic 3D Scene. The selection of the frame from the object cutout frame set can be based on user input selection criteria or a particular temporal order or position within the frame set. This can serve as the location marker of the object in the scene when other animated moving object cutout frame sets are still being replayed.

Figure 3:
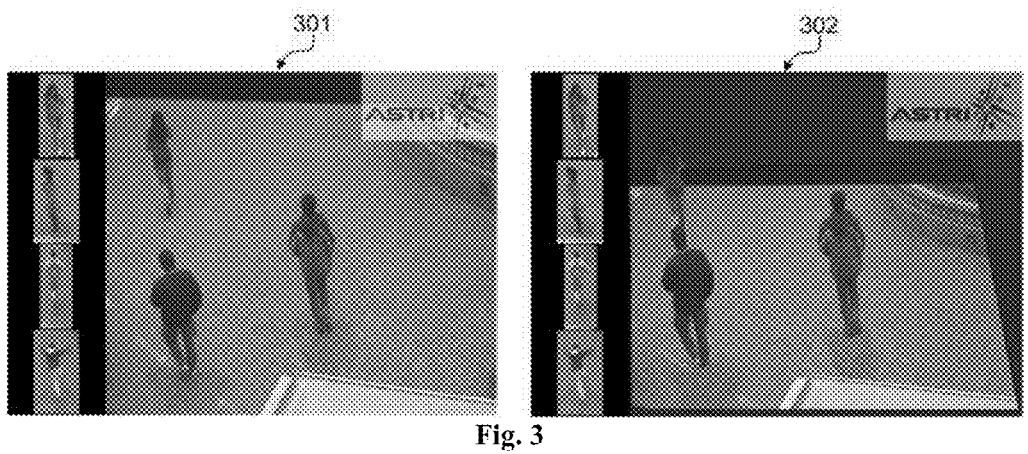
FIG. 3 shows an original view and a novel view captured from a different virtual camera viewpoint of a three-dimensional scene.

In accordance to another embodiment, the Dynamic 3D Scene enables the use of virtual camera to view the three-dimensional scene from various angles. As such, snapshot images and videos of novel views of the three-dimensional scene can be generated. To illustrate, FIG. 3 shows the original view 301 of the three-dimensional scene on the left; and on the right it shows a novel view 302 captured from a viewpoint that is slightly tilted to the right or counterclockwise from the original viewpoint.

In accordance to another embodiment, the output summary video comprises of two display regions: an appeared object list 101 and a scene review section 102 as shown in FIG. 1. The appeared object list 101 shows the snapshots or animations, 111 as shown in FIG. 1, of the moving objects of which the corresponding animated moving object cutouts 122 currently appearing in the Dynamic 3D Scene. If a moving object in the appeared object list 101 is shown as a snapshot, one frame of the animated moving object cutout frame set is used as the snapshot. If a moving object in the appeared object list 101 is shown as an animation, the frames of the animated moving object cutout frame set are replayed without regards to the spatial movement within the scene. The scene review section displays a virtual camera view of the Dynamic 3D Scene with the animated moving object cutouts. The appeared object list 101 can be placed anywhere within the display vertically or horizontally. The appeared object list 101 can also overlap the scene review section 102. In this case, the appeared object list 101 appears translucent so as not to obscure the scene review section 102.

In accordance to one embodiment, the top-to-bottom order of appearance of the moving objects 111 in the appeared object list 101 is the same as the temporal order of the corresponding animated moving object cutouts 122 appearing in the Dynamic 3D Scene in the scene review section 102 with the top most object in the appeared object list 101 corresponding to the most recently appeared animated moving object cutout.

Figure 2:
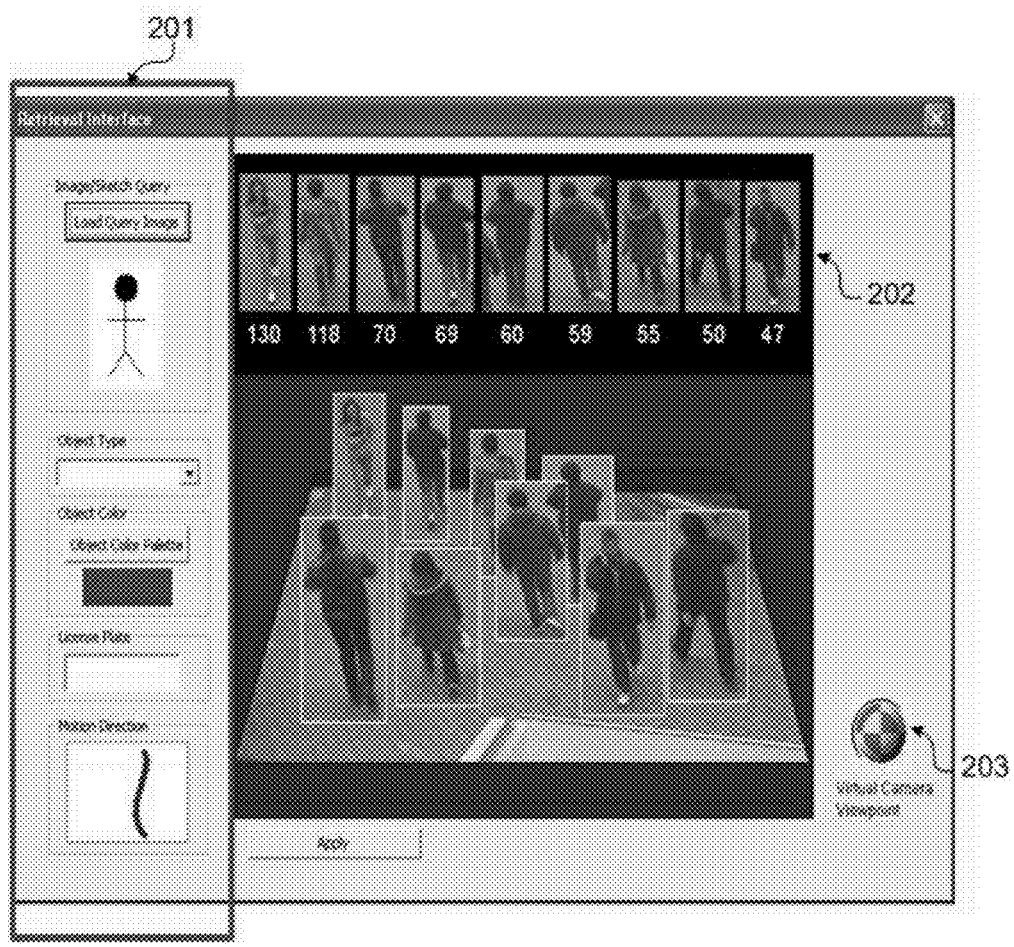
FIG. 2 shows an exemplary computer system application user interface incorporating the summary video with relevance sorting and ranking features.

Referring to FIG. 2. In accordance to various embodiments of the presently claimed invention, the summary video using Dynamic 3D Scene can be incorporated in a computer system with an application user interface. One embodiment of the user interface includes a user input criteria selection window 201 wherein object relevance criteria such as shape, color, type of the object, spatial movement or motion direction of the moving object, and license plate number in the case which the moving object is a vehicle. Each animated moving object cutout is assigned a relevance number based on how closely matched it is to the relevance criteria selected. The moving objects in the appeared object list 202 are then labeled with their respective relevance numbers. The snapshots or animations of the animated moving object cutouts in the appeared object list are sorted by their respective relevance rankings. In one embodiment, the relevance of the animated moving object cutout can also be used to dictate the temporal order of appearance of the animated moving object cutout in the Dynamic 3D Scene.

Still referring to FIG. 2. In one embodiment, the computer system application user interface includes a virtual camera control 203 for adjusting the viewing angle of the Dynamic 3D Scene.

The embodiments disclosed herein may be implemented using general purpose or specialized computing devices, computer processors, or electronic circuitries including but not limited to digital signal processors (DSP), application specific integrated circuits (ASIC), field programmable gate arrays (FPGA), and other programmable logic devices configured or programmed according to the teachings of the present disclosure. Computer instructions or software codes running in the general purpose or specialized computing devices, computer processors, or programmable logic devices can readily be prepared by practitioners skilled in the software or electronic art based on the teachings of the present disclosure.

In some embodiments, the present invention includes computer storage media having computer instructions or software codes stored therein which can be used to program computers or microprocessors to perform any of the processes of the present invention. The storage media can include, but are not limited to, floppy disks, optical discs, Blu-ray Disc, DVD, CD-ROMs, and magneto-optical disks, ROMs, RAMs, flash memory devices, or any type of media or devices suitable for storing instructions, codes, and/or data.

The foregoing description of the present invention has been provided for the purposes of illustration and description. It is not intended to be exhaustive or to limit the invention to the precise forms disclosed. Many modifications and variations will be apparent to the practitioner skilled in the art.

The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A computer-implementable method for creating a summary video with depth information, comprising:

receiving, by a computer processor, an input original video;

recognizing, by the computer processor, one or more moving objects from the input original video, wherein the moving object recognition is based on selection criteria including object shapes and forms, colors, exact appearances, and patterns of spatial movement;

generating an animated moving object cutout for each of the one or more recognized moving objects, by the computer processor duplicating and stacking successive frames in the input original video containing images of the respective moving object and discarding frame image pixels surrounding the respective moving object;

constructing a scene background, by the computer processor using texture of scenes in the input original video and estimating any missing portion;

rendering a Dynamic 3D Scene, by the computer processor using depth information of foreground objects in the input original video and the scene background to create a three-dimensional scene and overlaying the one or more animated moving object cutouts on to the three-dimensional scene according to their respective longitude, latitude, and depth locations in the three-dimensional scene; and synthesizing, by the computer processor, the summary video using the Dynamic 3D Scene;

wherein the summary video comprises two display regions: an appeared object list and a scene review section;

wherein the appeared object list shows snapshots or animations of the one or more animated moving object cutouts currently appearing in the Dynamic 3D Scene; and wherein the scene review displays a virtual camera view of the Dynamic 3D Scene with the one or more animated moving object cutouts.

2. The method of claim 1, wherein the Dynamic 3D Scene includes a virtual camera for viewing the three-dimensional scene from various angles.

3. The method of claim 1, wherein the scene background is automatically constructed by the computer processor or input by user.

4. The method of claim 1, wherein temporal orders of appearance of the animated moving object cutouts in the Dynamic 3D Scene are configurable as such to not same as temporal orders of appearance of the respective moving objects in the input original video.

5. The method of claim 1, wherein two or more of the moving objects that appear in different time periods are appearing together in the Dynamic 3D Scene simultaneously by overlaying the respective animated moving object cutouts together on to the three-dimensional scene at their respective locations in the three-dimensional scene.

6. The method of claim 1, wherein order of appearance of the snapshots or animations of the animated moving object cutouts in the appeared object list is the same as the temporal order of the corresponding animated moving object cutouts appearing in the Dynamic 3D Scene in the scene review section.

7. The method of claim 1, wherein each snapshot or animation of animated moving object cutout in the appeared object list is labeled with a relevance number; wherein the relevance number represents degree of matching of the animated moving object cutout to a set of user-selectable relevance criteria including shape, color, type of object, spatial movement or motion direction of a moving object, and license plate number for a moving object being a vehicle.

8. The method of claim 7, wherein the animated moving object cutouts are ranked according to their respective relevance; and wherein the snapshots or animations of the animated moving object cutouts in the appeared object list are sorted by their respective relevance ranking.

9. The method of claim 7, wherein the animated moving object cutouts are ranked according to their respective relevance; and wherein temporal orders of appearance of the animated moving object cutouts in the Dynamic 3D Scene are dictated by the relevance rankings of the animated moving object cutouts.

* * * * *